Jan. 14, 1930.  A. JORDAHL  1,743,675
AIR FILTER
Filed March 10, 1923
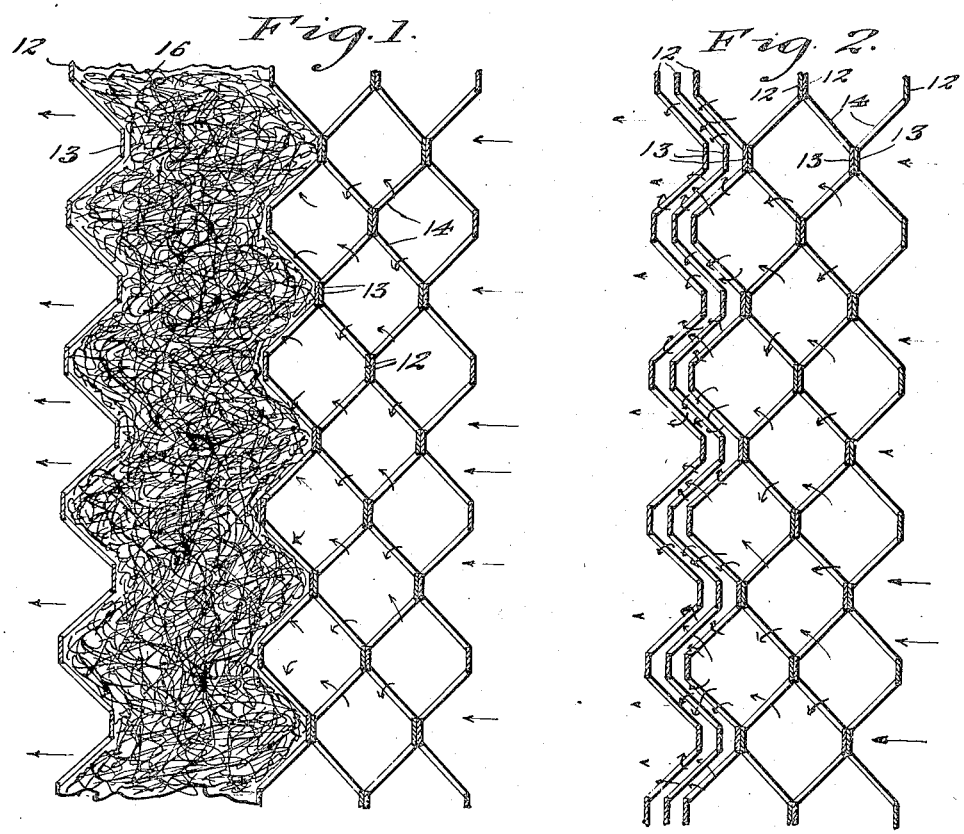
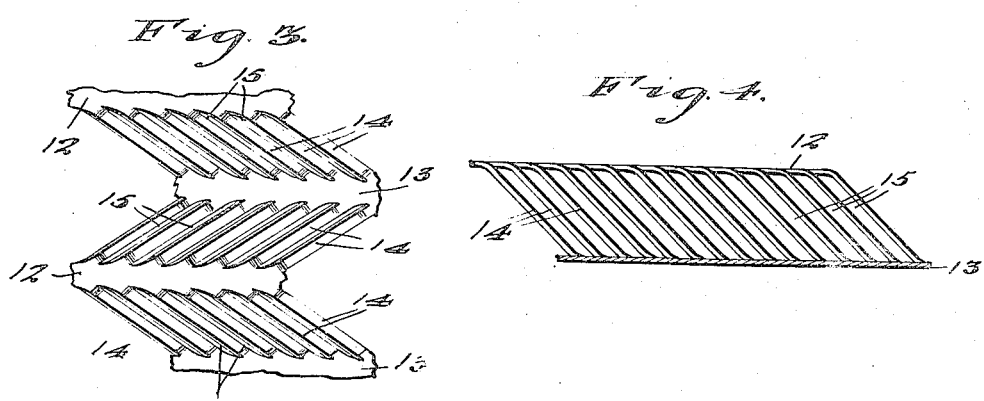
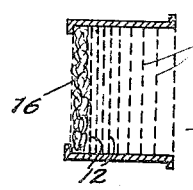
Witness
R.Q. Thomas
Inventor
Anders Jordahl
Attorney Patented Jan. 14, 1930

1,743,675

UNITED STATES PATENT OFFICE

ANDERS JORDAHL, OF NEW YORK, N. Y.

AIR FILTER

Application filed March 10, 1923. Serial No. 624,171.

This invention relates to purifiers or filters for air and the like gases and its object is to provide a method and apparatus for more effectively and efficiently removing dust or the like, solid impurities from air, or other gases when such solids are either detrimental or undesirable in the gas per se as in the chemical arts or where the solids or dust are harmful and undesirable in their effect upon the apparatus acting upon the air as in the case of air compressors, turbo-generators or explosive engines.

To this end the invention consists in the provision of means for removing the solid impurities from the air or gas in a progressive manner by subdividing the same in different sections of the filter so that the velocity of the individual streams or currents of the air or gas will be progressively increased between the ingress and egress sides of the filter. The particles of dust or other foreign matter separated by inertia resulting from the change in direction of the air currents are caused to engage with and be retained by the dust entrapping means in the different sections of the filter whereby even the most minute particles of dust may be removed and the air or gas delivered from the egress side of the filter in a thoroughly purified or cleaned condition.

It is also an important object of the invention to provide the several filter sections of relatively different porosities which are so constructed that the predetermined degree of resistance to the air or gas in each section of the filter will be maintained substantially constant and invariable throughout the operation of the filter, while at the same time, the possibility of clogging and impairment of the efficient operation of the filter by dust accumulations on the parts thereof is largely obviated.

I propose to so arrange these expanded metal sheets relative to each other in a plurality of series so as to produce a filter structure having groups of voids or pockets with the pockets in successive groups progressively diminishing in area in the direction of flow of the air or gas. It will therefore, be evident that by this decrease in the size or area of the voids through which the air or gas may pass, the velocity thereof will be proportionately increased. In this manner, I am enabled to separate and successively entrap and retain dust particles of relatively different sizes and different specific gravities, the larger dust particles being thus caught and retained on the walls of the filter pockets on the ingress side of the filter while the finer dust particles are forcibly impacted by the air or gas eddies of higher velocity against the walls of the pocket groups at the egress side of the filter, and owing to the relative inertia of such fine dust particles, they are caught and retained in the latter pockets.

I have illustrated my invention by showing the preferred embodiment thereof in the accompanying drawings in which Figure 1, is a vertical section taken through a portion of one of my new filters. Figure 2 is a similar section to Figure 1 but taken through a portion of a simpler form of my filter.

Figure 3 is a plan view of a small piece of my filter mediums or sheets while Figure 4 is a side elevation of the piece of filter medium shown in Figure 3.

Figure 5, is a sectional detail showing the arrangement of the filtering elements arranged so that the spaces therebetween are successively decreased.

It is to be understood however that the showing in the drawings is simply illustrative of my invention and is not to be taken as limiting for obviously the invention is capable of many different embodiments without departing from the spirit and scope thereof.

Referring now more particularly to the drawings it will be seen that my combined filter is made up of a plurality of metallic filter elements, each composed of a sheet of expanded metal made up of pairs of parallel raised ribs 12, having a depressed rib 13, therebetween and parallel thereto, with the ribs 12 and 13 connected together by diagonally extending strips 14 spaced apart from each other by slits 15 with said strips being integral with the ribs 12 and 13. The strips are used in sets and the strips of one set are oppositely directed to the adjacent sets of strips. The front part of the filter is formed with the sheets in this relation but the back portion of the filter has a plurality of the sheets in nested relation as shown in Figure 2 so that the strips 14 of adjacent sheets are further apart in the front of the filter than they are in the back. I maintain the filter mediums or sheets of expanded metal in this relative relation by any suitable means such as soldering or by encasing the edges of the filter in a suitable frame. By this arrangement of the expanded metal sheets, there is produced spaced groups of filter pockets or voids, the pockets in each group being of uniform area and the groups of pockets collectively decreasing in area from the ingress to the egress side of the filter. The individual filter pockets are formed between the spaced parts of the adjacent expanded metal sheets, and it will be obvious that the relationship between the adjacent parts of these expanded metal sheets determines the area of the pockets through which the air must pass, thereby effecting the desired variation in the velocity of the air between the ingress and egress sides of the filter.

The filter is then covered or coated with some dust entrapping substance such as a viscous oil and the operation of the filter is that the air is drawn into it as shown by the arrows and in passing through the slits 15 the air draught is broken up or deflected by the strips into eddies of increased velocity whereby the dust particles are by reason of their relative inertia more effectively caught and entrapped by the viscous substance on the sheets.

As the air passes through the succeeding sheets, succeedingly smaller eddies are produced with the consequent progressive increasing velocity of such eddies whereby the lighter dust particles (which have escaped entrapment in the first filter sheets) are entrapped. And finally when the air reaches the nested filter sheets, the eddies are broken up into the smallest size with the consequent entrapment of the finest dust particles which have heretofore escaped being trapped. Thus is produced a filter for air and the like which is progressive in its action.

In Figure 1 I show a slightly different form of filter from that shown in Figure 2 the difference being that instead of having the nested sheets I substitute for them some still finer dust entrapping medium 16 which in the case of air is steel wool but which in the case of other gases can be any desired fibrous substance or filter medium such as charcoal or kieselguhr. In connection with this form it is desired to point out that by having the ribs 12 and 13 of the sheets lie horizontally an undulating surface is presented to the steel wool or other substance 16 so that it is maintained in place. This form of filter also includes a coating of some viscous substance as in the preceding form. The operation of this embodiment is the same as the one previously described except the steel wool will catch even finer dust than the nested sheets used in the form shown in Figure 2 so that ordinarily the form of Figure 2 will be used where it is only desired to rid the air of the greater part of its dust while the form of Figure 1 will be used when it is desired to eliminate all the dust from the air.

Figure 5, digrammatically shows the screen elements 12, arranged so that the distances between adjacent screens are successively reduced and shows a final screening element of mineral wool 16, or like substances. This arrangement carries out the principle herein set forth, namely, increasing the density of the entrapping means and increasing the velocity of the air or gas there through. Obviously, this progressively increasing density may be obtained either by placing the screen successively closer together or by having progressingly smaller perforations in each successive screen or by combining both of said means.

This invention has been successfully demonstrated in practice and it also has the great commercial value of costing only a fraction of what all other filters cost having this capacity and usefulness. Thus I have produced an air filter of unusually cheap construction that is highly efficient by making it progressive in its action and by using as a principal part thereof a cheap commercial product already on the market.

What I claim as my invention is:—

1. In an air and gas filter, a plurality of foraminous filter elements cooperatively arranged relative to each other in a plurality of series of said elements and providing a plurality of groups of filter pockets with the pockets in each group of substantially uniform area and the areas of the pockets in the different groups progressively decreasing in the direction of flow of the air or gas.

2. In an air and gas filter, a plurality of foraminous, substantially rigid filter elements having viscous coated walls and cooperatively arranged in a plurality of series of said elements to provide a plurality of groups of dust entrapping and retaining pockets with the pockets composing said groups progressively decreasing in area in the direction of flow of the air or gas.

3. In an air and gas filter, a plurality of corrugated, foraminous, filter elements of the same cross sectional form cooperatively arranged to provide a plurality of groups of dust entrapping and retaining filter pockets with the pockets in each group of substantially uniform area and the areas of the pocket groups progressively decreasing in the direction of flow of the air or gas.

4. In an air and gas filter, a plurality of foraminous, corrugated, expanded metal sheets, certain of said metal sheets being arranged in opposed relation to provide a group of dust entrapping and retaining pockets of uniform area, and certain other of the expanded metal sheets being arranged in nested relation with each other to provide a second group of dust entrapping and retaining pockets of relatively smaller area.

5. In an air and gas filter, a filter structure embodying a plurality of corrugated expanded metal sheets of the same cross sectional form, certain of said sheets being arranged with the opposed walls of corrugations in adjacent sheets diverging from each other to provide a group of dust entrapping and retaining pockets of uniform area, and others of said metal sheets being arranged with the walls of the corrugations in spaced parallel relation to each other to provide a second group of dust entrapping and retaining pockets also of uniform area, and of comparatively smaller area than the first named group of pockets.

6. In an air and gas filter, a plurality of rigid foraminous metal filter elements arranged in a plurality of series, all of said elements being of the same form and construction, and the elements in one series having parts relatively positioned to form a group of dust entrapping and retaining pockets of uniform area, and the elements composing the other series being relatively arranged with the corresponding parts thereof forming another group of dust entrapping and retaining pockets also of uniform area but of less area than the first group of pockets to thereby provide a filter body of cellular structure offering a progressively increasing resistance to the flow of air between the ingress and egress sides of the filter.

Signed at New York, N. Y., in the county of New York, and State of New York, this 28th day of February A. D. 1923.

ANDERS JORDAHL.